US008881505B2

(12) United States Patent
Frazier (10) Patent No.: US 8,881,505 B2
(45) Date of Patent: Nov. 11, 2014

(54) APPARATUS, SYSTEM, AND METHOD FOR ADAPTIVE ENGINE SYSTEM CONTROL WITH INTEGRATED GLOBAL POSITION SENSING

(75) Inventor: Timothy R. Frazier, Columbus, IN (US)

(73) Assignee: Cummins IP, Inc., Minneapolis, MN (US)

( * ) Notice: Subject to any disclaimer, the term of this patent is extended or adjusted under 35 U.S.C. 154(b) by 375 days.

(21) Appl. No.: 13/390,299

(22) PCT Filed: Aug. 13, 2010

(86) PCT No.: PCT/US2010/045528
§ 371 (c)(1),
(2), (4) Date: Mar. 15, 2012

(87) PCT Pub. No.: WO2011/020063
PCT Pub. Date: Feb. 17, 2011

(65) Prior Publication Data
US 2012/0167555 A1     Jul. 5, 2012

Related U.S. Application Data

(60) Provisional application No. 61/233,548, filed on Aug. 13, 2009.

(51) Int. Cl.
*F01N 3/00*       (2006.01)
*F01N 9/00*       (2006.01)
*B60W 40/12*    (2012.01)
*B60W 10/06*    (2006.01)

(52) U.S. Cl.
CPC ............... *B60W 10/06* (2013.01); *F01N 9/002* (2013.01); *Y02T 10/47* (2013.01); *B60Y 2300/476* (2013.01); *F01N 2900/102* (2013.01); *B60W 40/12* (2013.01); *B60W 2550/143* (2013.01); *B60W 2530/14* (2013.01); *B60W 2550/402* (2013.01); *F02D 2200/701* (2013.01); *Y02T 10/54* (2013.01); *B60W 2510/0657* (2013.01)
USPC ................... 60/285; 60/286; 60/295; 60/311

(58) Field of Classification Search
CPC ......... F01N 9/002; F01N 9/023; F01N 9/005; F02D 41/0235; F02D 41/024; F02D 41/0245; F02D 41/027; F02D 41/0275; F02D 41/028; F02D 41/029; F02D 41/026; F02D 41/1433
USPC .............. 60/272–311; 701/99, 101–104, 30.2
See application file for complete search history.

(56) References Cited

U.S. PATENT DOCUMENTS

| 2003/0135323 | A1 | 7/2003 | Votsmeier et al. |
| 2005/0166580 | A1* | 8/2005 | Pfaeffle et al. .................. 60/295 |

(Continued)

FOREIGN PATENT DOCUMENTS

| JP | 03-199613 | 8/1991 |
| JP | 08-291708 | 5/1996 |

OTHER PUBLICATIONS

PCT/US2010/045528 International Search Report and Written Opinion, mailed Apr. 27, 2011.

*Primary Examiner* — Jesse Bogue
*Assistant Examiner* — Philip Eklem
(74) *Attorney, Agent, or Firm* — Foley & Lardner LLP (57) ABSTRACT

According to one embodiment, an apparatus includes an electronic controller (15) for an internal combustion engine (12) of a motor vehicle. The electronic controller includes a location detection module (32) configured to identify a location of the motor vehicle by a global positioning system (GPS) device (18). Also, the electronic controller includes a driving condition prediction module (34) configured to determine a direction of travel and access geographic information data for a path to be traveled by the motor vehicle. The electronic controller also has a simulation module (36) configured to simulate engine performance including effects from parasitic loads. Still further, the electronic controller includes a parasitic load control module (38) configured to adjust the timing for one or more of a regeneration process for an exhaust filter and at least one other parasitic load in order to maintain engine performance at or above a predetermined threshold.

28 Claims, 4 Drawing Sheets

(56) References Cited

U.S. PATENT DOCUMENTS

| | | | |
|---|---|---|---|
| 2007/0219682 A1* | 9/2007 | Kumar et al. ................. 701/19 |
| 2009/0044530 A1* | 2/2009 | Gallagher et al. ........... 60/605.1 |
| 2009/0171549 A1 | 7/2009 | Hyde et al. | |

* cited by examiner

APPARATUS, SYSTEM, AND METHOD FOR ADAPTIVE ENGINE SYSTEM CONTROL WITH INTEGRATED GLOBAL POSITION SENSING

FIELD

This disclosure relates to exhaust gas after-treatment systems for internal combustion engines and more particularly relates to the timing of regeneration events, exhaust after-treatment events, parasitic events, and other processes based on driving conditions.

BACKGROUND

In order to improve the efficiency and fuel consumption of internal combustion engines, control systems for such engines are often controlled in an appropriate manner by electronic engine controllers. Some internal combustion engines have exhaust gas after-treatment systems associated therewith to reduce the emissions of these engines. Such exhaust gas after-treatment systems may be turned on and off at scheduled times by the electronic engine controllers.

Exhaust gas after-treatment systems for diesel engines often include a particulate matter filter system. Particulate matter filter systems developed in recent years make it possible to strongly reduce particle emissions in diesel powered vehicles. For example, some particulate matter filters may remove more than 97% of the particulate matter from the exhaust gas. At certain time intervals, it is necessary to remove soot deposits from a particulate filter so that the flow resistance does not reduce engine performance. To that end, the electronic engine controller can initiate a regeneration process in which a soot layer is burned off. The resulting products of the regeneration process may include, for example, carbon dioxide and water vapor. The controller may also initiate regeneration of other exhaust gas after-treatment devices in the same or similar manner as particulate filters.

Burning off soot during a regeneration process of a filter, or other component, requires high exhaust gas temperatures, such as, for example, temperatures above 550 degrees C. To achieve such high exhaust gas temperatures, the temperature of exhaust gas often is artificial raised via a temperature raising event. Conventionally, temperature raising events include injecting hydrocarbons into the exhaust gas stream upstream of an oxidation catalyst, adjusting the operating parameters of the engine, and activating a heating element in heat transfer communication with the exhaust. Regardless of the type of temperature raising event, active exhaust gas temperature increases for regenerating a particulate matter filter are often necessary to assure reliable ongoing filter operation.

For motor vehicles, the operations associated with regenerating exhaust after-treatment components, such as particulate filters, typically have been initiated at predetermined operation time intervals, predetermined vehicle driving distances, or when an excessive amount of matter accumulated on a component has been detected. Artificially increasing the exhaust gas temperature for regenerating a component can have negative consequences on the performance and efficiency of an engine depending on the operating conditions of the engine at the time the exhaust temperature is raised. However, in conventional systems, the initiation of a regeneration event often is initiated regardless of the operating conditions or driving conditions of the engine. Accordingly, regeneration events, while optimizing the performance of an exhaust gas after-treatment system component, can negatively affect the performance and efficiency of an engine if not coordinated with a current or future operating state of an engine.

SUMMARY

From the foregoing discussion, it should be apparent that a need exists for an apparatus, system, and method that predicts parasitic loads that will be placed on an internal combustion engine based on driving conditions, such as location and direction of travel, and expediting or delaying triggered regeneration events based on the prediction. Regarding regenerating exhaust after-treatment components, conventional systems focus only on improving the efficiency or protecting exhaust after-treatment components, and fail to adequately maintain the performance and efficiency of the engine. Accordingly, described herein are embodiments that account for occurring and potential parasitic loads in determining the timing of a regeneration process to keep engine performance and efficiency at or above predetermined levels. Engine performance and efficiency includes, but is not limited to, engine speed, vehicle speed, engine power, fuel efficiency, and other engine characteristics.

The embodiments described herein have been developed in response to the present state of the art, and in particular, in response to the problems and needs in the art that have not yet been fully solved by currently available engine control systems. Currently available engine control systems have not been developed to control regeneration processes for adequately improving performance of engines, such as by achieving a desired fuel efficiency, an emissions reduction efficiency, a regeneration efficiency, and other engine performance parameters, such as maintaining a vehicle speed, maintaining engine RPM, and the like. Accordingly, at least some of the embodiments described herein have been developed to provide an apparatus, system, and method for timing the regeneration and other processes that overcome many or all of the shortcomings in the art.

As used herein, the term engine performance refers to any of various engine performance parameters, such as maintenance of speed of vehicle travel, maintenance of engine RPM, maintenance of power output by the engine for moving the vehicle down the road, maintenance or improvement of fuel efficiency of the engine, maintenance of exhaust after-treatment component efficiency, maintenance of an exhaust after-treatment regeneration efficiency, maintenance of emissions efficiency, and any combination thereof. For example, performance may include maintaining a predetermined fuel efficiency and vehicle speed. Performance may also encompass maintaining performance of the vehicle while running auxiliary systems that cause parasitic or other losses of power.

The apparatus in accordance with one embodiment may include an electronic controller having a plurality of modules configured to functionally execute operational steps including the step of detecting, by a detection module, at least one of a time elapsed or a condition indicating that an exhaust after-treatment system component needs to be regenerated. Embodiments of the method may also include identifying a location of a motor vehicle by a location detection module operably connected to a global positioning system (GPS) device. Still further, the method may include determining a direction of travel and accessing geographical information data for a path to be traveled by the motor vehicle, for example, by a driving condition prediction module. Still further, the embodiments of the method may include adjusting the timing for one or more of a regeneration process for an exhaust gas after-treatment system and at least one other parasitic load by a parasitic load control module in order to maintain engine performance at or above a predetermined threshold.

According to one embodiment, an apparatus includes a controller configured to determine a current load of the engine and predict a future load of the engine at a future driving location. The future driving location is based on the detected location and geographic information. The controller may also initiate an exhaust after-treatment process if a difference between the predicted future engine load and a desired engine load for an exhaust after-treatment process is greater than a predetermined threshold representing a current state of the exhaust gas after-treatment system. Further, the controller can delay a requested exhaust after-treatment process until the vehicle arrives at the future location if the difference between the predicted future engine load and the desired engine load for the exhaust after-treatment process is less than the predetermined threshold. The predetermined threshold can be based on a comparison between a current capability of the exhaust gas after-treatment system and a desired capability of the exhaust after-treatment system. In certain implementations, the current capability of the exhaust gas after-treatment system is determined based on at least one of the temperature, flow rate, and pressure of exhaust gas as sensed by physical sensors or predicted using models known in the art. The current capability, in certain instances, can be determined using techniques commonly known in the art. In some implementations, a future driving location is based on at least one of a present location of the vehicle, geographic information, a current vehicle speed, a current vehicle direction, and a current vehicle acceleration. A future driving condition can be based on the future driving location.

In accordance with some embodiments, these steps can be facilitated when the apparatus includes an article of manufacture that has a computer program storage medium readable by a processor and embodying one or more instructions executable by a processor to perform a method for determining timing of a regeneration process or other process causing a parasitic load on an internal combustion engine of a motor vehicle.

The method may further include enabling a user to enter a predetermined performance parameter by a user input module. Embodiments of the method also include simulating engine performance including effects from parasitic loads by a simulation module.

In another aspect, the apparatus in accordance with an embodiment may include an electronic controller for an internal combustion engine of a motor vehicle. The electronic controller may include a location detection module configured to identify a location of the motor vehicle by a global positioning system (GPS) device. The electronic controller may include a driving condition prediction module configured to determine a direction of travel and access geographic information data for a path to be traveled by the motor vehicle. The electronic controller may also have a simulation module configured to simulate engine performance including effects from parasitic loads. Still further, the electronic controller may include a parasitic load control module configured to adjust the timing for one or more of a regeneration process for an exhaust filter and at least one other parasitic load in order to maintain engine performance at or above a predetermined threshold.

According to one embodiment, a system may include additional elements in a motor vehicle or separate from the motor vehicle. For example, a system for timing a regeneration process in an exhaust system of a motor vehicle in accordance with the present disclosure may include an internal combustion engine and a controller operatively connected to the internal combustion engine. The controller may be configured to control the internal combustion engine and other components. The system may include a global positioning system (GPS) device operably connected to the controller and configured to provide data to the controller for detecting a location of the device and the motor vehicle in which the device is supported. The system may also include a database accessibly connected to the controller. The database may include geographic information. Thus, the controller may be configured to automatically receive a detected location from the GPS device and determine future driving conditions based on at least the location and a direction of travel. The controller may also automatically initiate a regeneration process in the engine at a time when a load from the regeneration process and other parasitic loads will be lower than a predetermined threshold.

In one embodiment, the controller initiates the filter regeneration process when a regeneration event is requested and contingent upon the predicted future driving conditions in which the predicted load is predicted to be lower than the predetermined threshold. In another embodiment, the controller initiates the filter regeneration process contingent upon the predicted future driving conditions in which a vehicle performance is maintained at or above a predetermined level.

A method according to one embodiment is also presented for maintaining vehicle performance such as vehicle speed. The method in the disclosed embodiments may include steps to carry out the functions presented above with respect to the operation of the described apparatus and system. In one embodiment, a method of timing a regeneration process or other event causing a parasitic load on an internal combustion engine of a motor vehicle in accordance with the present disclosure may include receiving a location and other geographic information from a global positioning system (GPS) device. The method may also include determining a direction and a route of a motor vehicle. Embodiments of the method also include determining engine performance and parasitic loads on an internal combustion engine of the motor vehicle at least in part based on the geographic information and the route. Furthermore, embodiments of the method include determining whether the parasitic loads are below a predetermined maximum.

In one embodiment, the method includes determining whether the parasitic loads are below a predetermined maximum when the engine has a predetermined engine performance under conditions corresponding to the geographic location and the other geographic information. In this embodiment, the method includes adjusting a regeneration process that causes a parasitic load on the engine. Adjusting may include adjusting a timing of the regeneration process relative to one or more of predicted events, driving conditions, and other processes that cause parasitic loads on the engine. In some embodiments, adjusting includes delaying regeneration when the parasitic loads, which may include the parasitic load of the regeneration process, are above the predetermined maximum.

Adjusting may cause or enable a desired engine performance, such as at least one of a vehicle speed, engine RPM, exhaust after-treatment component regeneration efficiency, and fuel efficiency to be maintained at or above a predetermined value. Embodiments of the method may include automatically selecting a combination of parasitic loads and causing the engine to run with the combination of parasitic loads in order to maintain a predetermined engine performance. Determining engine performance and parasitic loads may include simulating engine performance based on the location and the route. Embodiments of the method may include receiving geographic information data wirelessly from a remote location. Embodiments of the method may also include automatically selecting a combination of parasitic loads and causing the engine to run with the combination of parasitic loads in order to maintain a predetermined engine performance.

The term GPS as referred to herein may be replaced by any geographical locator, which may utilize one or more of global positioning, triangulation, databases, and other mechanisms to determine a location. Thus, reference to GPS throughout this specification is to be taken in a broad context to include any geographical locator device or combination of mechanisms for detecting and/or identifying a location.

Reference throughout this specification to features, advantages, or similar language does not imply that all of the features and advantages that may be realized with the present disclosure should be or are in any single embodiment of the disclosure. Rather, language referring to the features and advantages is understood to mean that a specific feature, advantage, or characteristic described in connection with an embodiment is included in at least one embodiment of the present disclosure. Thus, discussion of the features and advantages, and similar language, throughout this specification may, but do not necessarily, refer to the same embodiment.

Furthermore, the described features, advantages, and characteristics of the present disclosure may be combined in any suitable manner in one or more embodiments. One skilled in the relevant art will recognize that the subject matter of the present disclosure may be practiced without one or more of the specific features or advantages of a particular embodiment. In other instances, additional features and advantages may be recognized in certain embodiments that may not be present in all embodiments of the present disclosure.

BRIEF DESCRIPTION OF THE DRAWINGS

In order that the advantages of the subject matter of the present disclosure will be readily understood, a more particular description of embodiments of the disclosure briefly described above will be rendered by reference to specific embodiments that are illustrated in the appended drawings. Understanding that these drawings depict only typical embodiments of the present disclosure and are not therefore to be considered to be limiting of its scope, embodiments of the present disclosure will be described and explained with additional specificity and detail through the use of the accompanying drawings, in which.

DETAILED DESCRIPTION

Figure 1:
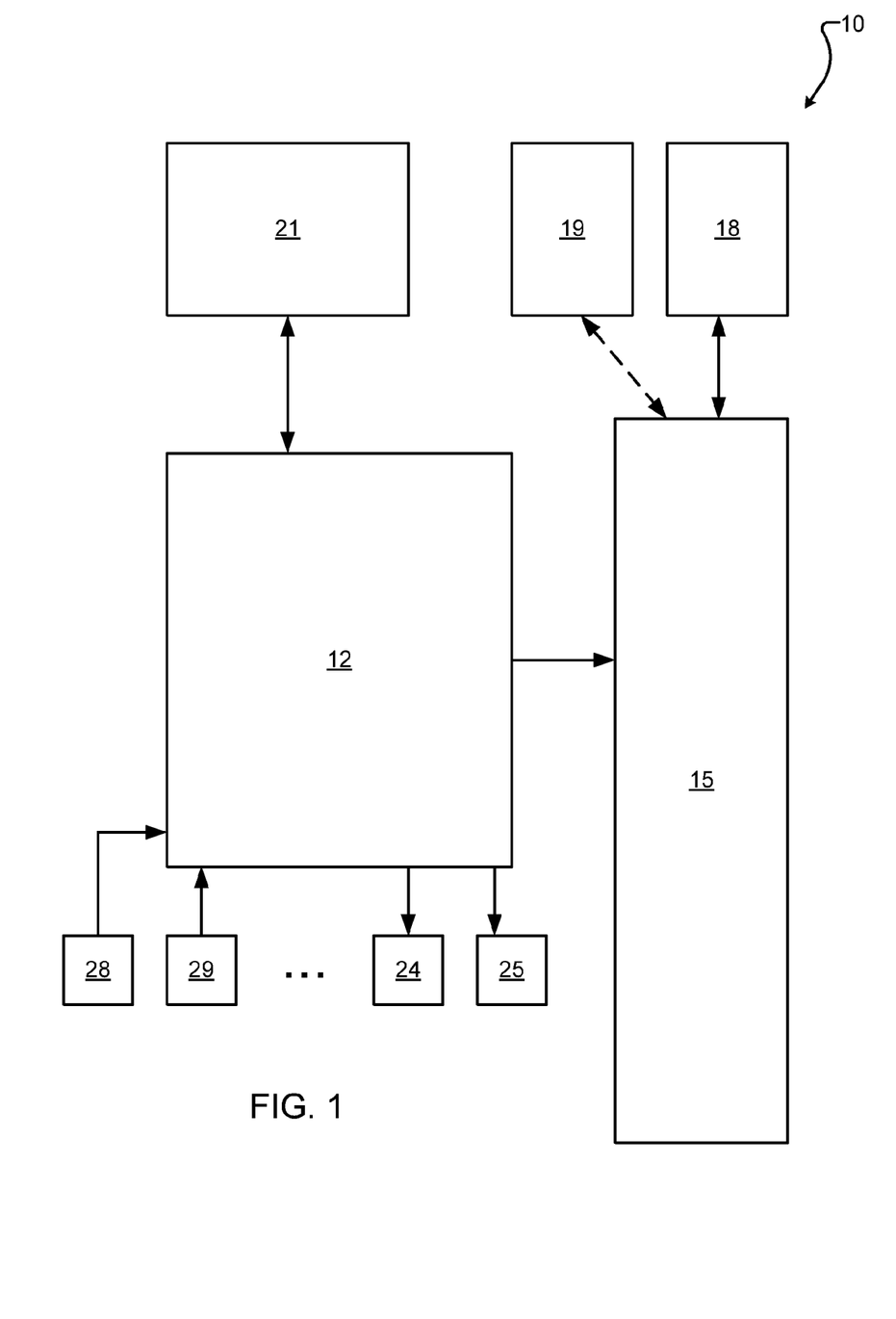
FIG. 1 is a schematic block diagram illustrating one embodiment of a system for adaptive control of exhaust gas after-treatment processes according to one representative embodiment.

FIG. 1 is a schematic block diagram of a system 10 in which the timing of regeneration events on a particulate matter filter, or other component, of an exhaust gas after-treatment system is selectively adjusted. The system 10 includes an internal combustion engine 12. The internal combustion engine 12 may be a diesel, gasoline, or other engine. An electronic controller 15, for implementing operational steps in accordance with an embodiment of a method described herein, is operatively connected to the engine 12. A global positioning system (GPS) device 18 may be supported in the same motor vehicle that is being powered by the engine 12. The system may also include a database 19 of geographical information that is either held locally in memory accessible by the electronic controller 15 or stored on a server remote from the motor vehicle. When the database 19 is remote, the electronic controller may access information for a particular location via a wireless connection, such as through a cellular, radio frequency, and/or satellite network.

The engine may have an engine electronics controller 21, such as an original equipment manufactured engine electronics controller or an engine electronics controller that has been added after original manufacture. The engine electronics controller 21 controls engine operating conditions, such as, for example, exhaust conditions, fuel consumption, power output, vehicle speed, and engine speed (RPM). In certain implementations, the electronic controller 15 may be combined with the engine electronics controller 21. Alternatively, the electronic controller 15 and engine electronics controller 21 may be provided by a plurality of separate components that may include, for example, processors, storage media, and equipment control units with one or more respective separate controllers.

The engine 12 is connected to or includes several components or auxiliary systems that when run cause parasitic loads on the engine, including the exhaust after-treatment system. The components or auxiliary systems require power output from the engine or increased fuel usage without returning power or conserving energy for moving the vehicle. In particular, one or more exhaust gas after-treatment systems 24, 25 are connected in exhaust receiving communication with an exhaust output of the engine. In one example, the exhaust gas after-treatment system 24 includes an exhaust gas particulate matter filter for filtering particulate matter from exhaust gas received from the engine 12. The exhaust gas after-treatment system 24 can also include either an electrical heating element or hydrocarbon injector to raise the temperature in the exhaust prior to entering the filter. As discussed above, the heating elements or hydrocarbon injector are used to increase the exhaust gas temperature for conducting regeneration events on the filter. The energy required to raise the temperature of the exhaust for regeneration events on a particulate matter filter causes parasitic losses, which results in a greater load on the engine 12 or increased fuel consumption.

In another example, the exhaust gas after-treatment system 24 can include a selective catalytic reduction (SCR) system for improving exhaust emissions by reducing $NO_x$ in the exhaust gas. Similar to regeneration events on a particulate filter, urea dosing and $NO_x$ reduction in the SCR system 25 may require an increase in exhaust gas temperature for efficient operation. The same or similar methods for increasing exhaust gas temperature associated with the particulate filter system 24 can be used to increase exhaust gas temperature for the SCR system 25. Accordingly, operation of the SCR system 25 can result in parasitic loads on the engine 12.

Other components 28, 29 associated with the engine 12 can also place parasitic loads on the engine. For example, parasitic losses can occur when temperature and/or vehicle speed conditions require an auxiliary cooling fan to be run. Such a fan requires electricity or other power derived from the engine 12.

Engine exhaust temperatures are a function of multiple factors including the loads placed on the engine and the duty cycle or type of driving that is being undertaken in a vehicle supporting the engine and exhaust system. Exhaust system after-treatment processes are more efficient and require less energy and/or other resources when performed under certain conditions or ranges of conditions. For example, regeneration is facilitated when the engine and exhaust temperatures are relatively high. Therefore, the timing of when exhaust system after-treatment processes are performed affects not only the effectiveness and efficiency of the processes, but the performance and efficiency of the engine as well. The parasitic losses resulting from operation of the auxiliary systems and components, including the exhaust after-treatment system components, reduce the amount of power that the engine can utilize for moving the vehicle or maintaining the speed of the vehicle. However, the negative effect parasitic losses may have on the performance and efficiency of an engine can be reduced by selectively timing the processes relative to engine duty cycle and other parasitic loads that will be placed on the engine 12. Thus, control of when auxiliary systems and components are run becomes important when attempting to maintain engine performance and efficiency.

Figure 2:
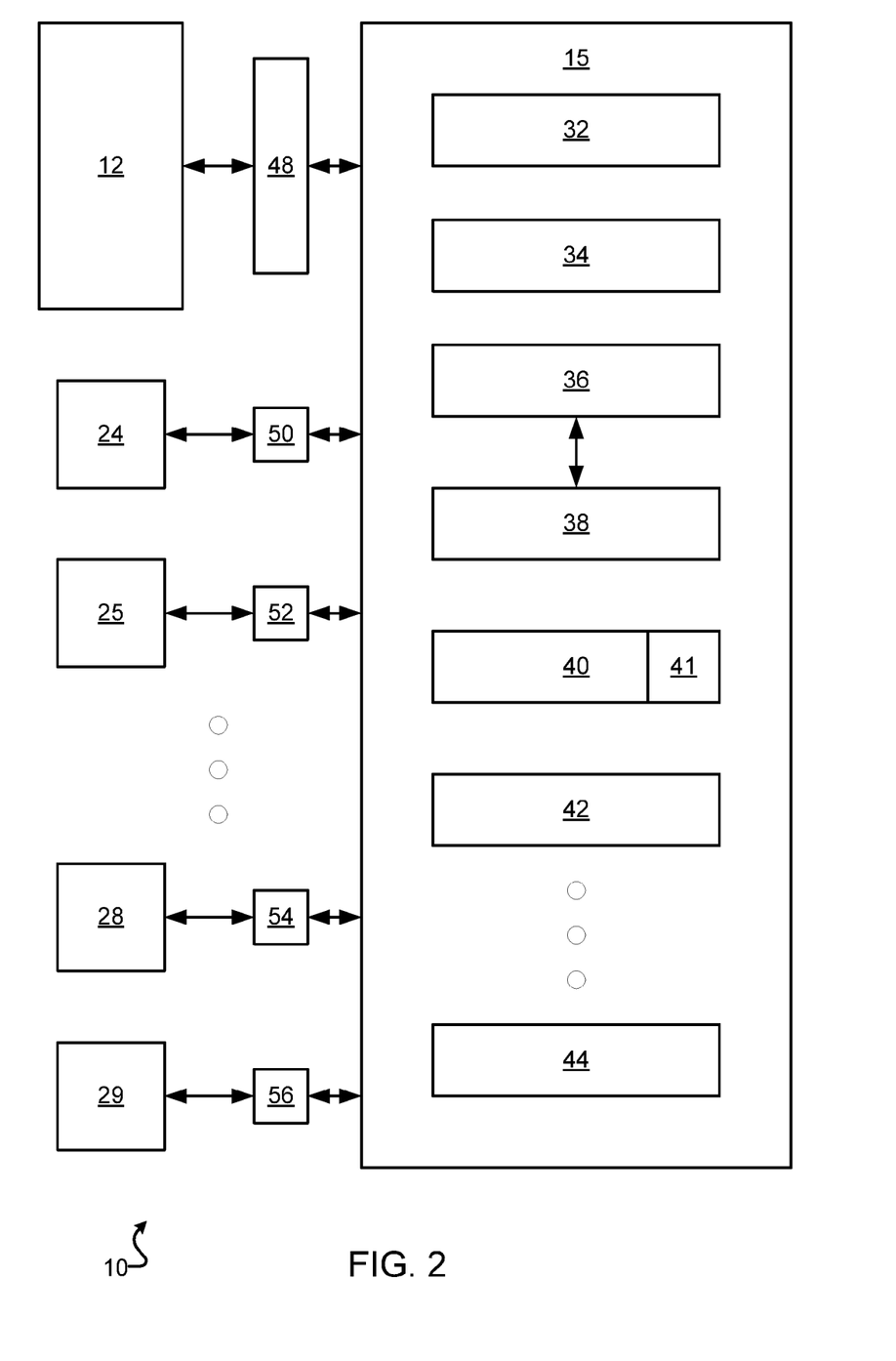
FIG. 2 is a schematic block diagram of an electronic controller according to one representative embodiment.

FIG. 2 is a schematic block diagram of the electronic controller 15 with a plurality of modules as they relate to the system 10. The electronic controller 15 has any of a variety of modules that may include software, circuitry, mechanical components, or any combination thereof. The modules may include, for example, a location detection module 32 that accesses information provided by the GPS device 18. Accessing the information may be accomplished by one of requesting the information due to measured or otherwise detected conditions, or by the controller being configured to automatically receive the information at predetermined intervals. A driving condition prediction module 34 either in the electronic controller or operatively connected thereto is configured to determine a direction of travel of the motor vehicle, for example, by comparing the location of the vehicle at two or more times. Further, the driving condition prediction module 34 accesses geographic information regarding current and predicted future locations along a route of travel. The driving condition prediction module 34 can retrieve the geographical information directly from the database 19, or may cause the electronic controller 15 to obtain the information. The geographical information may include topographical information indicating hill locations and expected elevation changes.

The electronic controller 15 also includes a simulation module 36 that utilizes current geographical locations from the location detection module 32 and predicted future locations from the prediction module 34 to simulate the engine performance and the expected parasitic loads on the engine 12. For example, the simulation module 36 may be configured to simulate current and future engine performance based on at least one of a current speed, a predetermined future speed, a current driving condition, and a future driving condition of the vehicle based on geographic information. In some embodiments, when the route to be traveled is already known, then simulation may include inputting a predetermined route into the location detection module 32. Additionally, simulation may include accessing information through the GPS device 18. In this way, the driving condition prediction module 34 can utilize the information from the GPS device 18 to predict future driving conditions.

A parasitic load control module 38 can interface with the simulation module 36 to receive feedback or otherwise utilize the simulation for determining if adjustments need to be made in the operation of the engine 12 and/or its associated components. In particular, the parasitic load control module 38 analyzes the power output from the engine 12, driving conditions, the parasitic loads, and external factors, such as grade, wind, weather conditions, etc., to determine appropriate adjustments to the components, including adjustments in timing and power levels at which the components may be run or when a regeneration of the components may be initiated. This analysis may include analyzing one or both of current and future power output and conditions. Thus, the analysis may include predicting and analyzing future driving conditions.

The parasitic load control module 38 selectively expedites or delays exhaust system after-treatment and other processes based on current and future conditions and, in some embodiments, whether those conditions are compatible with a determined level of performance or efficiency of the engine. For example, during stretches in which the elevation variation is small, the controller may be configured to initiate a selective catalytic reduction process to reduce $NO_x$ in the exhaust gases since small changes in altitude are compatible with this process. On the other hand, stretches in which the engine load, and thus exhaust temperature, will be higher are beneficial for efficient regeneration processes of the after-treatment system components. Accordingly, a regeneration process may be delayed until the vehicle is operating under more favorable operating conditions for a regeneration event or other process, such as when the vehicle is moving on an uphill portion of a driving route. Other conditions in which the exhaust temperature will be comparatively higher and more appropriate for a regeneration event may include situations in which the external temperature is high, when there is a strong headwind, and when the vehicle has a heavy load.

Additionally, or alternatively, the expedition or delay of exhaust after-treatment processes can be based on parameters other than the availability of desirable engine exhaust gas temperatures. For example, in one embodiment, the system utilizes simulation to maintain one or more of a predetermined level of fuel economy, a predetermined vehicle speed, a predetermined engine RPM, a predetermined exhaust pressure, and/or a predetermined exhaust flow rate.

FIG. 2 also shows a user input module 40 that may include a user interface 41. Thus, a user may selectively adjust the performance threshold as he or she may choose by inputting one or more predetermined performance parameters. For example, a user may input a desired exhaust gas temperature level for regeneration events, a desired frequency of regeneration events, a desired emissions efficiency, and other like factors. Additionally, when it is desired to maintain engine RPM at or above a certain level, the user can enter this lower limit into the electronic controller through the user interface 41. Thereafter, the controller will expedite or delay an after-treatment process if the combination of parasitic loads and external factors in view of the user input are respectfully less or more conducive to performing the process. Any combination of processes can be implemented by the parasitic load control module 38 in order to preserve the desired exhaust gas temperatures, level of engine efficiency, engine performance, vehicle speed as inputted by a user. Also, it is to be understood that the thresholds may be originally set at default levels such that user input is not required.

A detection module 42 may form part of the electronic controller 15, or may be associated with the electronic controller 15, for the purpose of detecting a condition (e.g., triggering event) for initiating the exhaust after-treatment system regeneration. For example, the detection module 42 may receive a signal from one or more sensors detecting pressure differentials across one or more exhaust gas filters when these filters become clogged to a point at which regeneration is needed. Alternatively or additionally, the detection module 42 may detect an elapse of time or a mileage traveled that is considered to coincide with the need for regeneration of the exhaust gas after-treatment system. One or more additional modules 44 may be incorporated in or associated with the electronic controller 15 for implementing the method or variations thereof without limitation.

The various modules 32, 34, 36, 38, 40, 42, 44 and the electronic controller 15 of FIG. 2 are configured generally to interact directly with the engine 12 and the components 24, 25, 28, 29 or to interact with the engine 12 and components 24, 25, 28, 29 through electrical or electromechanical controls 48, 50, 52, 54, 56. For example, the electronic controller 15 can operate to adjust idle speeds, fuel/air ratios, and the like based on feedback from the engine or engine electronics controller 21. Based on the simulation of future driving conditions as discussed above, the electronic controller 15 in general, and the parasitic load control module 38 in particular, can delay an exhaust system after-treatment process until conditions will enable the most efficient performance of the process. Alternatively, the processes may be delayed until these processes will not interfere with the vehicle speed or other performance criteria, for example. In contrast, based on the simulation of future driving conditions as discussed above, the electronic controller 15 in general, and the parasitic load control module 38 in particular, can expedite an exhaust system after-treatment process if current conditions will be better than predicted future conditions to achieve the most efficient performance of the process. Alternatively, the processes may be expedited if performing the processes later will interfere with the vehicle speed or other performance criteria, for example At an appropriate time, based on simulation or other methods of predicting the road conditions and engine loads/performance, the electronic controller 15 or parasitic load control module 38 can initiate and control the regeneration systems 24, 25 through controls 50, 52. In fact, the electronic controller can automatically select an appropriate combination of components 24, 25, 28, 29 that can be run and initiate their operations at the appropriate times through controls 50, 52, 54, and 56. The parasitic load control module 38 may interact with the location detection module 32 and the driving condition module 34 in conjunction with the GPS device 18 or some other geographical locator to predict driving conditions and associated predictable engine load, vehicle performance, exhaust gas characteristics. Thus, efficiency and/or engine performance, including a desired RPM, vehicle speed, exhaust gas temperature and/or other performance parameter can be maintained and the timing and/or other characteristics of the regeneration and other parasitic load processes can be adjusted such that these processes do not interfere with a desired efficiency or engine performance.

While two exhaust after-treatment systems 24, 25 are shown and described herein, it is to be understood that one regeneration system may be sufficient in some systems 10. Furthermore, other systems 10 may incorporate two, three or more regeneration systems or other exhaust system after-treatment systems. Also, even though four components 24, 25, 28, and 29 have been shown and described herein, a system 10 may include any number greater or less than four components that cause parasitic loads without departing from the spirit and scope of embodiments of the subject matter of the present disclosure.

Figure 3:
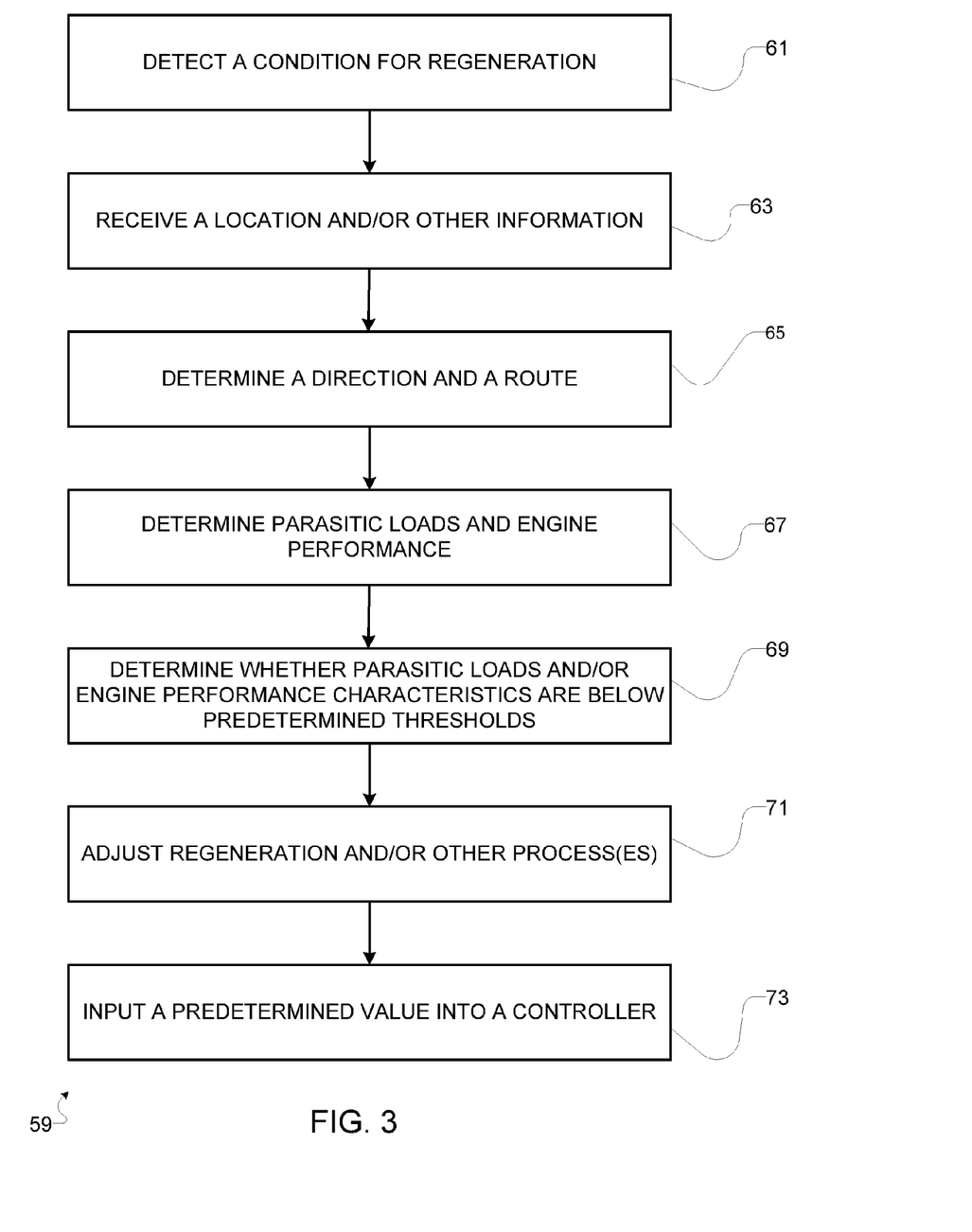
FIG. 3 is a schematic flow diagram illustrating one embodiment of a method for controlling the timing of an exhaust gas after-treatment process according to one representative embodiment.

FIG. 3 is a schematic flow diagram of one embodiment of a method 59 that includes detecting a condition associated with an exhaust after-treatment system process, such as a regeneration event, at 61. In certain implementations, the condition is one or more of an accumulated amount of particulate matter on a filter, a current time relative to a predetermined time for regenerating a filter, a current mileage relative to a predetermined mileage for regeneration a filter. The method 59 determines or receives a location of the vehicle at 63. It is to be understood that receiving vehicle location information at 63 may be initiated before, during, or after the condition is detected at 61. Based on receipt of the vehicle location and other information, the method 59 determines a current direction and/or route being traveled, as well as a predicted future direction and/or route to be traveled, by a motor vehicle at 65.

The method 59 includes determining (e.g., by simulation or other techniques) parasitic loads and/or engine performance at 67. Determining parasitic loads and engine performance may include determining current parasitic loads and engine performance characteristics and/or predicting future parasitic loads and engine performance characteristics based on a predicted direction and/or route to be traveled. Accordingly, parasitic loads and engine performance characteristics may be determined based at least in part on the characteristics of the route being traveled and to be traveled. The method 59 also includes determining whether the parasitic loads and/or engine performance characteristics are above, at, or below predetermined thresholds at 69.

The characteristics of after-treatment processes and/or other processes being performed or to be performed (e.g., timing and aggressiveness) may be adjusted at 71 based on the determined parasitic loads and engine performance characteristics to achieve desired engine or exhaust system performance and/or efficiency. For example, the method 59 may initiate a regeneration event early if a predicted future route is significantly downhill. Alternatively, as another example, rather than artificially increase an engine exhaust gas temperature for a scheduled regeneration event, to increase fuel efficiency, the method 59 may delay the initiation of the regeneration event until a vehicle engages an uphill portion of a route.

The method 59 may also include inputting of user preferences by a user at 73. The input may be made through a user interface of the electronic controller. Thus, the timing and/or aggressiveness of after-treatment processes, including regeneration events, can be adjusted automatically or manually to maintain efficiency and/or avoid a degradation of vehicle and engine performance.

It is to be understood that the method 59 may, in addition or alternative to action 61, detect an emissions condition, such as the presence of an excessive amount of $NO_x$ in the exhaust gas stream, for triggering a $NO_x$ or other emissions reduction event. The emissions reduction event can include the injection of a reductant into the exhaust gas stream. Therefore, like regeneration events on a filter, the system and method can determine an appropriate timing for an emissions reduction event based on driving conditions predicted through use of a GPS device.

Figure 4:
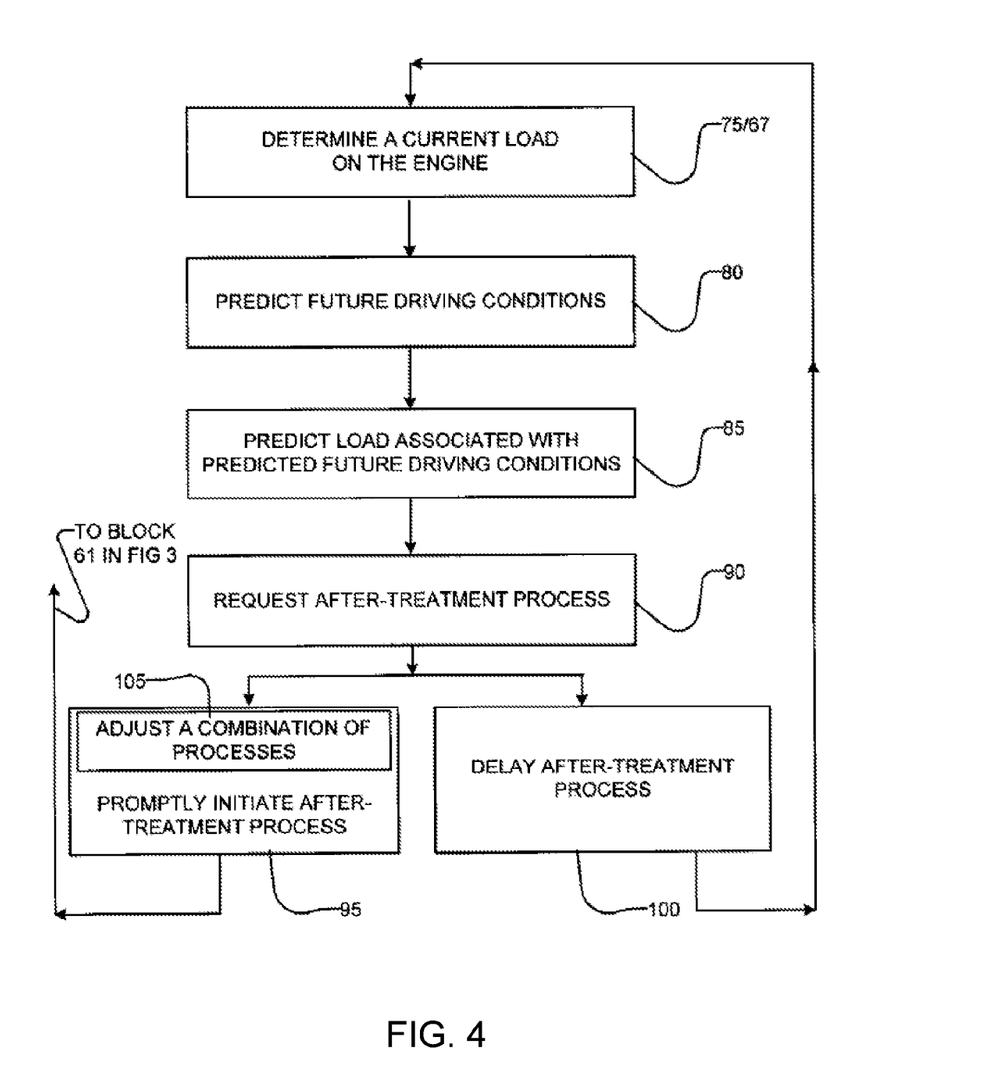
FIG. 4 is a schematic flow diagram illustrating another embodiment of a method for controlling the timing of an exhaust gas after-treatment process according to one representative embodiment.

As shown in FIG. 4, a system for timing an after-treatment process in an exhaust system of a motor vehicle may implement additional operations in an exhaust after-treatment system. These operations may be part of the method 59 of FIG. 3, and may include sub-steps of the operations 67, 69, and 71 of the method. For example, in one embodiment, the controller is configured to determine a current load on the engine as indicated at 75, and predict a future driving condition at a future location based on the detected location and geographic information as indicated at 80. The controller is also configured to predict an engine load associated with the future driving conditions as indicated at 85. Periodically, or when initiated in response to detection of a need to do so, the controller requests an after-treatment process as indicated at 90. When the exhaust gas after-treatment process is requested, the controller undertakes one of two operations depending on driving conditions, loads, and parameters that are set either to a default or in accordance with user input. These parameters provide target(s), or upper and/or lower threshold(s), for determining whether a process can be initiated, and/or what combination of processes can be implemented.

The various processes take predetermined amounts of time to run from start to finish, depending on temperatures and other conditions. The controller takes into account these run time requirements when determining whether and which processes can be undertaken by the system.

In one case, if a difference between the predicted load on the engine at a future location and a target or threshold load on the engine for acceptable implementation of the particular exhaust after-treatment process is greater than a difference between a current load on the engine and the target or threshold load on the engine, then the controller promptly initiates the exhaust after-treatment process. That is, if the conditions for implementation of the process will become less ideal in the near future, then the controller initiates the process immediately as indicated at 95.

Alternatively, if the difference between the predicted load on the engine at the future location and the target load on the engine for acceptable implementation of the particular exhaust after-treatment process is less than the difference between the current load on the engine and the target load on the engine, then the controller delays the exhaust after-treatment process until the vehicle arrives at the future location as indicated at 100. That is, if the conditions become more ideal for the particular after-treatment process in the near future, then the process is postponed at least until the future location is reached.

After delaying or initiating the after-treatment process, the method returns to operation 75 to determine a current load on the engine or to operation 61 to detect a condition for an after-treatment process, respectively. The method 59 may cycle through these operations continuously during operation of the motor vehicle. The frequency with which sampling of driving conditions and other data may be retrieved may be in any of various frequencies, such as between once per millisecond and once per minute, without limitation.

The controller may include or have a simulation module associated therewith that simulates engine performance corresponding with predicted future driving conditions based on future vehicle locations, direction of travel, and geographic data. Thus, the operations of predicting future driving conditions 80 and associated loads on the engine 85 may be implemented through simulations. These simulations may be implemented by a simulation module that simulates engine performance at future driving locations and for future driving conditions. The simulation module may simulate engine performance with or without an active parasitic process or processes.

A parasitic load control module may be configured to selectively control a combination of parasitic loads, such as regeneration and emission reduction events, based on feedback from the simulation module. If necessary to achieve a desired engine performance, fuel efficiency, or parasitic load efficiency, adjustment of the combination of processes at 105 can be performed prior to initiating the processes at 95.

With regards to filter regeneration parasitic loads, when determining whether to initiate a filter regeneration after-treatment process, the loads on the engine may be a determining factor since an engine under greater load tends to have higher operating and exhaust gas temperatures. In these cases, less additional energy is needed to artificially raise the temperature of the exhaust gas. However, in some cases, a balance must be achieved in which the total parasitic loads do not interfere with an acceptable level of engine and/or vehicle performance. In one embodiment, selecting between the operations of promptly initiating an after-treatment process 95 and delaying the after-treatment process 100 is determined based on engine performance as compared with a predetermined threshold. In this case, if the simulated engine performance associated with promptly initiating the exhaust after-treatment process is greater than a predetermined threshold, then the controller promptly initiates the exhaust after-treatment process, as indicated at 95. On the other hand, if the simulated engine performance is less than the predetermined threshold, and a simulated future engine performance associated with delaying the exhaust after-treatment process is more than the predetermined threshold, then the controller delays the exhaust after-treatment process 100 until the vehicle arrives at the future location.

When the after-treatment process is delayed, a delay module associated with the controller is configured to determine a maximum delay based on a condition of one or more exhaust after-treatment system components that are affected by the exhaust after-treatment system process. When a difference between the predicted load of the engine at the future location and the desired or target engine load for an acceptable after-treatment process is less than a difference between the current load of the engine and the desired or target engine load, then the controller delays the exhaust after-treatment process, as indicated at 100. However, the controller and delay module are configured to delay the after-treatment process no more than approximately the maximum delay.

Thus, even when the load on the engine is more ideal at the future location, the controller initiates the exhaust after-treatment process prior to the vehicle reaching the future location if a predicted amount of time for reaching the future location is greater than the maximum delay that is permitted. The controller may time the initiation of the process until a time corresponding to a duration for the process less than or approximately equal to the maximum delay.

As discussed above, timing particulate filter regeneration events according to predicted future uphill versus downhill driving conditions is advantageous because uphill grades typically result in greater loads on engines and higher operating temperatures. Therefore, when the predicted future driving condition includes an uphill climb associated with a predetermined grade increase relative to a current driving condition, the controller may delay the particulate filter regeneration event until the vehicle begins the uphill climb as indicated at 100 in FIG. 4. Alternatively, when the predicted future driving condition includes a downhill descent associated with a grade decrease relative to the current driving condition, the controller may promptly initiate the particulate filter regeneration event as indicated at 95 in FIG. 4 if the regeneration event cannot be delayed until after the predicted downhill descent. When a regeneration process is requested by the controller, and the predicted future driving condition is substantially the same as a current driving condition, the controller promptly initiates the particulate filter regeneration event.

In other cases, the after-treatment process includes a reductant dosing event for an SCR system for reducing $NO_x$ emissions in exhaust gas. For these catalytic reduction processes, acceptable driving conditions include driving on level or moderate grades. Thus, when the vehicle is driving on steep uphill or downhill grades, the controller will delay catalytic reduction processes when possible, which corresponds to element 100 in FIG. 4. Alternatively, when the predicted future driving conditions includes an uphill climb associated with a grade increase greater than a predetermined grade increase then the controller promptly initiates the after-treatment process, as indicated at 95, before the vehicle arrives at the uphill climb. This is the case when there is not a more moderate uphill grade portion of the route within range of the maximum delay. Similarly, when the predicted future driving condition includes a downhill descent associated with a grade decrease greater than a predetermined grade decrease relative to a current driving condition, the controller promptly initiates the reductant dosing event, as indicated at 95, before the vehicle arrives at the downhill descent. Once again, this is the case when there is not a more moderate grade portion of the route within range of the maximum delay.

A reductant dosing event may be delayed for an SCR system, as indicated at 100 in FIG. 4, when the controller identifies future moderate grade portions and/or other driving conditions of the route that are better adapted for such processes than the present driving conditions and that are within range of a maximum delay period. For example, when the predicted future driving condition includes an uphill climb associated with a grade increase less than a predetermined grade increase, or when the predicted future driving condition includes a downhill descent associated with a predetermined grade decrease less than a predetermined grade decrease relative to the current driving condition, then the controller delays the reductant dosing event, corresponding to element 100 of FIG. 4, until the future driving condition. This is conditioned on whether the future uphill climb or downhill descent promotes exhaust conditions that are acceptable for the reductant dosing event relative to current exhaust conditions. If so, the controller waits until the future driving condition and then initiates the reductant dosing event when the vehicle begins the uphill climb or downhill descent of the future driving condition. When the predicted future driving condition is the same or less ideal for a reductant dosing event than a present driving condition, the controller promptly initiates the event. This includes conditions where the grade is level or nearly level at the current and future locations and the exhaust conditions indicate $NO_x$ needs to be reduced to meet emissions standards.

Thresholds, loads, and predetermined grades may be set at defaults or selected in order to achieve a predetermined engine efficiency, after-treatment process efficiency, engine performance, vehicle performance, or combinations thereof. Efficiency and performance objectives can include desired exhaust after-treatment component conditions, fuel efficiency, engine power, and vehicle speed.

The controller in general and the simulation module in particular are configured to analyze loads and timing of plural processes simultaneously. Depending on driving conditions, present and future, the simulation module determines process period durations and initiates each process or combination of processes in a favorable manner to achieve a desired or target efficiency, performance, or a combination thereof. In some cases, timing of the processes is adjusted. In other cases, processes may be run in parts or piece-meal fashion. In some cases, selected combinations of processes are undertaken with specific timing to maintain loads below predetermined maximum values or above predetermined minimum values.

The simulation module is capable of simulating loads, temperatures, speeds, RPM, performance, and efficiency in a substantially continuous model. The period durations for the various parasitic processes, including the various after-treatment processes, are also simulated or otherwise predicted. Thus, the simulation enables determination of timing and selection of combinations of processes in a manner that is extremely robust. Maximum flexibility and utility is achieved with the controller and simulation module in accordance with embodiments of the present disclosure.

It is to be understood that although the GPS device 18 has been described herein as being associated with certain of the modules, the GPS device 18 may be associated with any one or a plurality of the modules without limitation. In particular, the GPS device 18 may operate in a conventional manner utilizing triangulation or trilateration between two or more satellites to determine coordinates on the surface of the earth and an elevation above sea level in order to pinpoint a location of the device 18, and in this case, a location of a vehicle in which the device is located. Typically, GPS systems actually use four or more satellites and require that the time be represented extremely accurately.

The GPS system 18 typically is associated with a database that has map data, route information, and/or geographical information that can be displayed to communicate the current location of the device 18 and other information to a user. In one embodiment, the information in the database, user-input (e.g., a desired or predicted route), and predicted locations of the vehicle along the route relative to time can be used to predict a future route. Thus, the database can be accessed to retrieve future driving conditions and characteristics without direct indication of the future location by the GPS device 18. In this case, the GPS device may be used to confirm that the vehicle is actually taking the predicted route. If not, then a new prediction can be made to enable future improvement of engine efficiency, performance and/or vehicle performance, which may be facilitated at least in part by timing of regeneration and/or other processes.

Other geographical locators may be utilized in place of or in addition to the GPS system described herein. For example, traffic telematic systems, traffic control systems, on-board computers of other vehicles, and/or traffic lights can communicate with the controller 15 or any of the modules within the controller 15 to communicate traffic conditions. These systems may also communicate weather, geographic, and other information without limitation.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. Where a module or portions of a module are implemented in software, the software portions are stored on one or more computer readable media.

Reference throughout this specification to "one embodiment," "an embodiment," or similar language means that a particular feature, structure, or characteristic described in connection with the embodiment is included in at least one embodiment of the present disclosure. Thus, appearances of the phrases "in one embodiment," "in an embodiment," and similar language throughout this specification may, but do not necessarily, all refer to the same embodiment.

Reference to a computer readable medium may take any form capable of storing machine-readable instructions on a digital processing apparatus. A computer readable medium may be embodied by a transmission line, a compact disk, digital-video disk, a magnetic tape, a Bernoulli drive, a magnetic disk, a punch card, flash memory, integrated circuits, or other digital processing apparatus memory device.

Furthermore, the described features, structures, or characteristics of the subject matter of the present disclosure may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the present disclosure. One skilled in the relevant art will recognize, however, that the subject matter of the present disclosure may be practiced without one or more of the specific details, or with other methods, components, materials, and so forth. In other instances, well-known structures, materials, or operations are not shown or described in detail to avoid obscuring aspects of the present disclosure.

The schematic flow chart diagrams included herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only an example of the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

The subject matter of the present disclosure may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A system for timing an after-treatment process in an exhaust gas after-treatment system of a motor vehicle coupled to an internal combustion engine, the system comprising:
    a controller operatively connected to the internal combustion engine, the controller configured to control the internal combustion engine and exhaust after-treatment system processes;
    a geographical locator operably connected to the controller and configured to provide data to the controller for detecting a location of the motor vehicle in which the locator is housed; and
    a database accessibly connected to the controller, the database storing geographic information;
    wherein the controller is configured to:
        determine a current load of the engine and predict a future load of the engine at a future driving location, the future driving location being based on the detected location and geographic information;
        initiate an exhaust after-treatment process if a difference between the predicted future engine load and a desired engine load for an exhaust after treatment process is greater than a predetermined threshold representing a current state of the exhaust gas after-treatment system; and
        delay a requested exhaust after-treatment process until the vehicle arrives at the future location if the difference between the predicted future engine load and the desired engine load for the exhaust after-treatment process is less than the predetermined threshold.

2. The system of claim 1, wherein the future driving location also is based on at least one of a direction of travel of the motor vehicle, a current vehicle speed, and a current vehicle acceleration.

3. The system of claim 2, wherein the controller is configured to automatically receive a signal representing the location of the vehicle at predetermined intervals such that a difference in locations from one interval to another establishes the direction of travel of the motor vehicle, the current vehicle speed, and the current vehicle acceleration.

4. The system of claim 1, wherein the controller comprises a simulation module configured to simulate engine performance corresponding with predicted future driving conditions based on at least one of the future driving location, direction of travel of the vehicle, vehicle speed, vehicle acceleration, and geographic information.

5. The system of claim 4, wherein the simulation module is further configured to simulate engine performance during the exhaust after-treatment process if initiated and simulate engine performance during the exhaust after-treatment process if delayed, the simulated engine performance being based on at least one of a current speed and a predicted future speed of the vehicle at the future location.

6. The system of claim 4, wherein the controller further comprises a parasitic load control module configured to selectively control a combination of parasitic loads based on feedback from the simulation module, and wherein the current and predicted engine loads arc based on the parasitic loads.

7. The system of claim 5, wherein the controller initiates the exhaust after-treatment process if the simulated engine performance associated with initiating the exhaust after-treatment process is less than a predetermined threshold, and the controller delays the exhaust after treatment process until the vehicle arrives at the future location if the simulated engine performance associated with delaying the exhaust after-treatment process is more than a predetermined threshold.

8. The system of claim 1, wherein the exhaust after-treatment process comprises a filter regeneration event, and wherein the controller promptly initiates the filter regeneration event if the predicted engine load is less than the current engine load, and the controller delays the exhaust after-treatment process until the vehicle arrives at the future location if the predicted engine load at the future location is greater than the current engine load.

9. The system of claim 1, wherein the exhaust after-treatment process comprises a reductant dosing event for a selective catalytic reduction system.

10. The system of claim 1, wherein the controller comprises a delay module configured to determine a maximum delay based on a condition of an exhaust after-treatment system component affected by the exhaust after-treatment system process, and wherein when the difference between the predicted engine load at the future location and the desired engine load for the exhaust after-treatment process is less than the difference between the current engine load and the desired engine load, the controller delays the exhaust after-treatment process no more than approximately the maximum delay.

11. The system of claim 10, wherein when the difference between the predicted engine load at the future location and the desired engine load for the exhaust after-treatment process is less than the difference between the current engine load and the desired engine load, the controller initiates the exhaust after-treatment process prior to the vehicle reaching the future location if a predicted amount of time for reaching the future location is greater than the maximum delay.

12. The system of claim 1, wherein the predicted future driving condition at the future location is based at least partially on a time history of engine performance.

13. The system of claim 1, wherein:
the exhaust after-treatment process comprises a particulate filter regeneration event;
when the predicted future driving condition comprises an uphill climb associated with a predetermined grade increase relative to a current driving condition, the controller delays the particulate filter regeneration event until the vehicle begins the uphill climb;
when the predicted future driving condition comprises a downhill descent associated with a grade decrease relative to the current driving condition, the controller promptly initiates the particulate filter regeneration event; and
when the predicted future driving condition is substantially the same as a current driving condition, the controller promptly initiates the particulate filter regeneration event.

14. The system of claim 1, wherein:
the exhaust after-treatment process comprises a reductant dosing event for a selective catalytic reduction system;
when the predicted future driving condition comprises a first uphill climb associated with a grade increase greater than a predetermined grade increase or a first downhill descent associated with a grade decrease greater than a predetermined grade decrease relative to a current driving condition, the controller promptly initiates the reductant dosing event; and
when the predicted future driving condition comprises a second uphill climb associated with a grade increase less than the predetermined grade increase or a second downhill descent associated with a predetermined grade decrease less than the predetermined grade decrease relative to the current driving condition, and the second uphill climb or second downhill descent promotes exhaust conditions for the reductant dosing event relative to current exhaust conditions, the controller delays the reductant dosing event until the vehicle begins the second uphill climb or second downhill descent.

15. The system of claim 1, wherein the controller is configured to promptly initiate the exhaust after-treatment process or delay the exhaust after-treatment process based on a desired fuel efficiency.

16. The system of claim 1, wherein the predetermined threshold is based on a comparison between a current capability of the exhaust gas after-treatment system and a desired capability of the exhaust after-treatment system.

17. An electronic controller for an internal combustion engine of a motor vehicle, the electronic controller comprising:
a location detection module configured to identify a location of the motor vehicle using a geographical locator device;
a driving condition prediction module configured to determine a direction of travel and access geographic information data to determine a predicted path to be traveled by the motor vehicle;
a simulation module configured to simulate engine performance including effects from parasitic loads; and
a parasitic load control module configured to adjust a timing for at least one of a regeneration process for an exhaust filter, a selective catalytic reduction process, and a parasitic load process in order to maintain at least one of engine performance and efficiency at or above a predetermined threshold during the at least one process.

18. The electronic controller of claim 17, further comprising a user input module configured to enable a user to enter at least one of a predetermined performance parameter and a predetermined efficiency parameter.

19. The electronic controller of claim 18, wherein the user input module further comprises a user interface, wherein the user interface enables a user to enter the predetermined threshold, the threshold comprising at least one of a minimum vehicle speed, and a minimum engine RPM.

20. The electronic controller of claim 17, wherein the simulation module models a load on the engine under present and future driving conditions and the parasitic load control module selectively determines when to initiate at least one after-treatment process based on a model of the simulation module.

21. A method of timing a regeneration process on an internal combustion engine of a motor vehicle, the method comprising:
receiving a location and other geographic information from a geographical locator device;
determining a direction and a route of a motor vehicle;
predicting future engine performance of an internal combustion engine of the motor vehicle based on the geographic information and the route;
modeling present and future loads, efficiency, and performance of the engine;
initiating a regeneration process if the future engine performance is below a threshold; and delaying a requested regeneration process if a current engine performance is below the threshold and the future engine performance is above the threshold;

receiving an after-treatment system process request; and selectively delaying initiation of the after-treatment process based on a simulation model in order to maintain at least one of efficiency and performance of the engine.

22. The method of claim 21, wherein modeling present and future loads comprises simulating at least one after-treatment system process including a period of duration of the after-treatment system process.

23. The method of claim 21, wherein predicting future engine performance comprises simulating present and future driving conditions.

24. The method of claim 21, further comprising selecting the threshold value and inputting that value into a controller operably connected to the engine.

25. The method of claim 21, further comprising a driving condition prediction module determining a direction of travel and accessing geographic information data for a path to be traveled by the motor vehicle.

26. An article of manufacture comprising a computer program storage medium readable by a processor and embodying one or more instructions executable by a processor to perform a to method for determining timing of an exhaust after-treatment system process, the method comprising:

detecting at least one of a time elapsed and a condition triggering a regeneration event on an exhaust after-treatment system component;

identifying a location of a motor vehicle based on data received from a geographical locator device;

predicting a future path to be traveled by the motor vehicle based on the identified location of the motor vehicle, a determined direction of travel of the motor vehicle, and geographical information;

simulating engine performance including effects from parasitic loads; and adjusting a timing of at least one of a parasitic load process and the regeneration event based at least partially on the predicted path to be traveled, the timing of the regeneration event, and the timing of the parasitic load process in order to maintain at least one of engine performance and efficiency at or above a predetermined threshold during at least one of the parasitic load process and the regeneration event.

27. The article of manufacture of claim 26, wherein the method further comprises simulating engine performance during at least one predicted active parasitic load.

28. The article of manufacture of claim 26, wherein the method further comprises enabling a user to enter a predetermined performance parameter.

* * * * *